United States Patent [19]

Hempel et al.

[11] 4,396,524

[45] Aug. 2, 1983

[54] PREPARATION OF POLYSILOXANE BLOCK POLYMERS AND THEIR USE AS FOAM INHIBITORS

[75] Inventors: Hans U. Hempel, Overath; Edmund Schmadel, Leichlingen; Herbert Reuter, Hilden; Günther Vogt, Tönisvorst, all of Fed. Rep. of Germany

[73] Assignee: Henkel Kommanditgesellschaft auf Aktien, Düsselforf-Holthausen, Fed. Rep. of Germany

[21] Appl. No.: 218,575

[22] Filed: Dec. 22, 1980

[30] Foreign Application Priority Data

Dec. 24, 1979 [DE] Fed. Rep. of Germany ....... 2952287

[51] Int. Cl.³ .................... B01D 19/04; C08G 77/44; C08L 83/10
[52] U.S. Cl. .............. 252/174.15; 252/321; 252/358; 525/477
[58] Field of Search .................. 252/321, 174.15, 358; 525/477

[56] References Cited

U.S. PATENT DOCUMENTS

| 3,113,930 | 12/1963 | Chevalier | 252/358 |
| 3,235,509 | 2/1966 | Nitsche et al. | 528/18 |
| 3,383,327 | 5/1968 | Sullivan | 252/321 |
| 3,436,439 | 4/1969 | Woods | 525/477 |
| 3,455,839 | 7/1969 | Rauner | 252/358 |
| 3,560,401 | 2/1971 | O'Hara et al. | 252/321 |
| 3,700,400 | 10/1972 | Cuthbertson | 252/321 |
| 3,819,745 | 6/1974 | Plante | 525/477 |
| 3,829,386 | 8/1974 | Wegst et al. | 252/135 |
| 3,933,672 | 1/1976 | Bartolotta et al. | 252/135 |

FOREIGN PATENT DOCUMENTS 2506203 5/1976 Fed. Rep. of Germany .
2646127 4/1977 Fed. Rep. of Germany .

*Primary Examiner*—Allan Lieberman
*Attorney, Agent, or Firm*—Hammond, Littell, Weissenberger and Muserlain

[57] ABSTRACT

This invention is directed to a method of preparing block copolymers useful as foam inhibitors, which method comprises the steps of:

(1) mixing (a) from 100 parts by weight of a polydimethylsiloxane that is liquid at 20° C., and (b) from about 2 to 20 parts by weight of a spatially cross-linked polysiloxane resin with a molecular weight of from about 1000 to 10,000;

(2) heating said mixture in the presence of a catalyst until the viscosity is at least 200 mPa.s, as measured at 20° C., to form a block polymer;

(3) mixing said block polymer with (c) from about 0.5 to 15 parts by weight of a silicon dioxide aerogel; and (4) heating the mixture from step (3).

23 Claims, No Drawings

PREPARATION OF POLYSILOXANE BLOCK POLYMERS AND THEIR USE AS FOAM INHIBITORS

FIELD OF THE INVENTION

This invention is directed to the preparation of polysiloxane block polymers. More particularly, this invention is directed to the preparation of polysiloxane oil/polysiloxane resin block polymers and the use of such polymers as foam inhibitors.

BACKGROUND OF THE INVENTION

Defoaming agents having a silicon base are known to consist of alkyl or aryl-substituted polysiloxanes and colloidal silicic acid. The effectiveness of these defoamers depends mainly on their stability in the solution to be defoamed and thus on their pretreatment.

A method for the preparation of stable polysiloxane defoaming agents in which the powdered silicic acid to be used is first "silanated" with low molecular siloxanes, such as octamethylcyclotetrasiloxane or tetradecamethylhexasiloxanes, by heating to temperatures above 350° C., and then suspended in dimethylpolysiloxane oil and heated at temperatures of approximately 200° C. for several hours, is known from U.S. Pat. No. 3,113,930. The defoaming agents obtained are stable in alkaline solutions. According to U.S. Pat. No. 3,235,509, Lewis acids are added as condensation catalysts during the heating of methylsiloxane polymer, which vitiates pretreatment of silicic acid to render it hydrophobic. The use of alkaline catalysts, for example, alkali metal or tetraalkylammonium hydroxides, for that purpose, is recommended in U.S. Pat. No. 3,560,401. The catalyst acts only at the interface between polysiloxane and filler in this method, and cleaving as well as polymerization reactions do not occur.

A different approach is disclosed in U.S. Pat. No. 3,455,839. According to this reference, mixtures of (1) dimethylpolysiloxanes with a viscosity of 20 to 1,500 cs. at 25° C., (2) resin-like organopolysiloxanes built up of $(CH_3)_3SiO_{\frac{1}{2}}$ and $SiO_2$ units at a ratio of 0.6:1 to 1.2:1, and (3) silicic acid aerogels are prepared for the preparation of stable demulgators by stirring the individual components together in random sequence at room temperature or at temperatures up to 170° C. Catalysts are not used, so that only a fixation of the silicic acid, but not a cross-linkage reaction between the dimethylpolysiloxane and the resin-like polysiloxane, takes place. Consequently the products of the process consist mainly of mixtures and not of block polymers.

The foam inhibitors described are effective in aqueous alkali or tenside solutions and are sufficiently stable that no loss of foam inhibiting effect occurs during the period of application, for example, during a washing and cleaning process. However, when the inhibitors are mixed with washing agents of conventional composition, which contain alkalies and tensides, for example, their effectiveness is somewhat reduced with extended storage time, so that foam problems can occur with the use of these agents after a storage period of several weeks. This loss of effectiveness is even greater when the foam inhibitors are mixed with the paste-like washing slurry, in the interest of a homogeneous distribution in the washing agent, and, together with the other constituents of the washing agent, spray dried.

For the prevention of a detrimental interaction of the polysiloxane demulgator with the alkaline components of a cleaning agent, U.S. Pat. No. 3,829,386 recommends, for example, the emulsifying of the polysiloxanes in an aqueous solution of a non-ionic tenside, and the addition of this emulsion to the products containing alkalies. According to U.S. Pat. No. 3,843,558, the organopolysiloxanes are first added to sodium tripolyphosphate, and this premix is then combined with the remaining washing agent components. U.S. Pat. No. 3,933,672 discloses that the interactions between the foam inhibitors and the tensides contained in washing and cleaning agents are held responsible for the reduction in foam inhibiting activity, and it is recommended that the polysiloxanes be added to a vehicle and also that the granulates obtained be covered with a coating material that cannot be penetrated by tensides. Among the polysiloxanes recommended for this method are, preferably, mixtures of polydimethylsiloxanes, siloxane resins, and silanted silicic acid, which thus correspond to the products of the process according to U.S. Pat. No. 3,455,839.

The disadvantage of the described methods or products of the methods is seen in the fact that they cannot be distributed homogeneously in the washing agent by a simple method, for example, by introduction into the washing agent slurry and subsequent spray-drying. On the contrary, multi-step granulating and mixing processes are needed to prevent a reduction of the effectiveness of the foam inhibitors during preparation and storage of the products. Particular problems arise with respect to the last mixing step, that is, the homogeneous incorporation of the relatively small amount of powder premix containing siloxane into the main bulk of the washing agent. An intensive mixing or milling necessarily would result in poorer powder quality due to formation of dust and destruction of the hollow sphere structure of the spray-dried powder components, while, on the other hand, inhomogeneities can cause foaming problems during use.

OBJECTS OF THE INVENTION

It is an object of the invention to provide a method for the preparation of polysiloxane oils/polysiloxane resin block polymers.

It is also an object of the invention to provide for the use of such block polymers as foaming inhibitors.

It is a further object of the invention to provide a method for preparing polysiloxane block polymers wherein a mixture of (a) 100 parts by weight of a polydimethylsiloxane that is liquid at 20° C., and (b) from about 2 to 20 parts by weight of a spatially cross-linked polysiloxane resin with a molecular weight of from about 1000 to 10,000, which is comprised of structural elements of the general formula

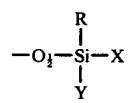

wherein R consists of from about 40 to 100 mol percent of a phenyl, phenylethyl, or alkyl radical having from 2 to 8 carbon atoms and of from 0 to about 40 mol percent of a methyl group, and X and Y, which can be the same or different, have the same meaning as R or can be OH, $O_{\frac{1}{2}}$, methyl, or $-OC_nH_{2n-1}$, wherein n is a number of from 1 to 4, with the proviso that the content of OH groups is from about 0.1 to 10 percent by weight, based on the total weight of the polysiloxane resin, is heated to temperatures of at least 80° C. in the presence of a Lewis acid or a basic substance as catalyst and, if desired, an organic solvent that does not react with the reaction components, until the viscosity increases steadily after an induction period and has reached a value of at least 200 mPa.s, as measured at 20° C., to form a block polymer, and the block polymer is then mixed in a known manner with from about 0.5 to 15 parts by weight of a silicic acid aerogel, which is preferably silanated, and heated.

These and other objects of the invention will become more apparent from the discussion below.

DETAILED DESCRIPTION OF THE INVENTION

The subject of the invention is a method for preparing polysiloxane block polymers which overcome the disadvantages known to the prior art. According to the invention, a mixture of (a) 100 parts by weight of a polydimethylsiloxane that is liquid at 20° C., and (b) from about 2 to 20 parts by weight of a spatially cross-linked polysiloxane resin with a molecular weight of from about 1000 to 10,000, which is comprised of structural elements of the general formula

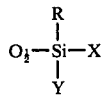

wherein R consists of from about 40 to 100 mol percent of a phenyl, phenylethyl, or alkyl radical having from 2 to 8 carbon atoms and of from 0 to about 40 mol percent of a methyl group, and X and Y, which can be the same or different, have the same meaning as R or can be OH, $O_{\frac{1}{2}}$, methyl, or $-OC_nH_{2n-1}$, wherein n is a number of from 1 to 4, with the proviso that the content of OH groups is from about 0.1 to 10 percent by weight, based on the total weight of the polysiloxane resin, is heated to temperatures of at least 80° C. in the presence of a Lewis acid or a basic substance as catalyst and, if desired, an organic solvent that does not react with the reaction components, until the viscosity increases steadily after an induction period and has reached a value of at least 200 mPa.s, as measured to 20° C., to form a block polymer. Then, the block polymer is mixed in a known manner with from about 0.5 to 15 parts by weight of a silicic acid aerogel, which is preferably silanated, and heated.

Suitable as liquid polydimethylsiloxane, that is, reaction component (a), are mainly cyclic polydimethylsiloxanes with from 3 to 6, or even more, siloxane groups, such as hexamethyl-cyclotrisiloxane, octamethylcyclotetrasiloxane, decamethyl-cyclopentasiloxane, dodecamethyl-cyclohexasiloxane, and their mixtures. Also suitable are linear polydimethylsiloxane-α,ω-diols with an average of from 5 to 100, preferably from 30 to 80, $(Ch_3)_2SiO$ units as well as polydimethylsiloxane mixtures such as are obtained after the hydrolysis of dimethyldichlorosilane. Such mixtures contain, for example, from 30 to 80 percent by weight of cyclic polydimethylsiloxanes, and from 20 to 70 percent by weight of the described linear polydimethylsiloxanes.

The polysiloxane resins, that is, reaction component (b), are known compounds that are obtained by the hydrolysis of phenyl, phenylethyl, or alkyl trichlorosilanes or by their cohydrolysis with dimethylchlorosilanes. Phenylethyltrichlorosilane can be obtained by addition of styrene to trichlorosilane. Spatially cross-linked resins with a content of free, active hydroxyl groups are formed during the hydrolysis. When the hydrolysis is carried out in the presence of lower alcohols of the formula $C_nH_{2n-1}OH$, hydroxyalkyl radicals which are also active in the block polymerization carried out according to the invention may also be formed.

The molecular weight of the polysiloxane resin (b), that is, the number-average molecular weight as measured osmometrically, is from about 1000 to 10,000, preferably from about 1200 to 5000.

The following polysiloxane resins have been found to be particularly suitable:

(B-1) Phenylmethylpolysiloxane resins with a content of from about 1 to 6 percent by weight, particularly from about 2 to 5 percent by weight, of hydroxyl groups and a molar ratio of phenyl to methyl groups of from about 2:3 to 10:1, particularly from about 1:1 to 5:1, obtainable by cohydrolysis of phenyltrichlorosilane and dimethyldichlorosilane.

(B-2) Phenylethylpolysiloxane resins with a content of from about 0.5 to 8 percent by weight, particularly from about 1 to 5 percent by weight, of hydroxyl groups, obtainable by hydrolysis of phenylethyltrichlorosilane.

(B-3) Alkylpolysiloxane resins in which the alkyl groups are branched and preferably contain from about 3 to 8 carbon atoms, with a content of from about 0.5 to 8, particularly from about 1 to 5, percent by weight of hydroxyl groups, obtainable by hydrolysis from alkyltrichlorosilane. Suitable alkyl groups include, for example, isopropyl, isobutyl, isoamyl, and 2-ethylhexyl groups.

(B-4) Phenylethylmethylpolysiloxanes or $C_3-C_8$-alkylmethylpolysiloxanes (with branched $C_3-C_8$-alkylradical) with a content of from about 1 to 6, preferably from 2 to 5, percent by weight of hydroxyl groups and a molar ratio of phenylethyl or $C_3-C_8$-alkyl groups to methyl groups of from about 2:3 to 100:1, obtainable by cohydrolysis of phenylethyltrichlorosilane or $C_3-C_8$-alkyltrichlorosilane with dimethyldichlorosilane.

Instead of the chloro-substituted silanes, the respective alkoxyl-substituted siloxanes with $C_1-C_4$-alkoxyl radicals also may be used for the hydrolysis or the cohydrolysis. The content of such alkoxyl groups in the polysiloxane resin (b) generally is less than 1 mol percent.

From about 2 to 25, preferably from about 3 to 20, and especially preferably from about 5 to 15 parts by weight polysiloxane resin (b) are used per 100 parts by weight polydimethylsiloxane (a). The foam inhibiting effect of the products of the process decreases with the increasing proportion of (b) as well as the increasing molecular weight, combined with a rise in viscosity. However, since the preparation of the polysiloxane resins is much more complex than that of the more readily accessible polydimethylsiloxanes, the proportion of component (b) should not be too high, particularly since the degree of polymerization as well as the viscosity and effectiveness of the block polymers can be increased and optimized in a much simpler way, as shall be shown below.

Since a homopolymerization of the polydimethylsiloxane also can take place in addition to the block polymerization, permethylated, low molecular siloxanes that cause a termination of the chain, such as hexamethyldisiloxane, octamethyltrisiloxane, or decamethyltetrasiloxane, may be added, if desired, for the monitoring of the degree of polymerization. The amount of such permethylated, low molecular siloxanes is determined by the desired degree of polymerization and can amount to as much as about 20 mol percent, preferably to as much as about 10 mol percent, based on the amount of reaction component (a) used. Such additions are not needed in most instances.

The acid or base catalyzed block polymerization can take place in the absence of a solvent, provided that the reaction partners can be mixed with each other. If they cannot be mixed, a reaction will be carried out in the presence of an organic solvent that does not enter into the reaction and thus does not compete with the reaction partners.

Suitable acid catalysts include Lewis acids such as $AlCl_3$, $BF_3$, and $ZnCl_2$, particularly, however, acid-activated bleaching earths such as, for example, acid-activated alumino-silicates of the montmorillonite type. The bleaching earths can, if necessary, be readily separated by filtering or centrifuging. It is advantageous to add from about 1 to 5, particularly from about 2 to 4, parts by weight of bleaching earth per 100 parts by weight of polydimethylsiloxane (a) that is used. However, bleaching earths are less suitable in the presence of organic solvents, so that basic catalysts would be preferred in such cases.

Suitable basic catalysts include quanternary ammonium bases with alkyl and/or hydroxyalkyl groups with from 1 to 4 carbon atoms, particularly tetramethyl-or tetraethylammonium hydroxide, as well as alkali metal hydroxides, especially potassium hydroxides. Additional suitable alkaline catalysts are mentioned in U.S. Pat. No. 3,560,401, incorporated herein by reference. Preferred such catalysts are those that are adequately soluble or can be dispersed in organic solvents. They can be present in amounts of from about 0.001 to 1, preferably from about 0.03 to 0.2, parts by weight, based on 100 parts by weight of the reaction component (a).

Suitable organic solvents are hydrocarbons that boil above 80° C., such as, for example, paraffin hydrocarbons (boiling range of from 80° to 200° C.), benzene, toluene, xylene, cumene, tetralin, decalin, methylcyclohexane, and p-menthane, as well as esters such as isopropyl acetate, butyl acetate, and ethyl glycol diacetate. The use of other solvents such as chlorinated hydrocarbons or high-boiling ethers also is possible in principle, but such substances are of little interest because of their toxicity (chlorinated hydrocarbons), the possible formation of peroxide (ethers), and/or their higher cost of preparation. Those solvents in which the catalyst can be dissolved are preferred since a homogeneous catalysis facilitates the block polymerization.

The viscosity of the block polymers must be at least 200 mPa.S, as measured at 20° C., at the end of the reaction. When less than 10 parts by weight of component (b) are used per 100 parts by weight of component (a), the viscosity is preferably at least 400 mPa.s and especially preferably more than 500 mPa.s. When from about 10 to 15 parts by weight of component (b) are used, a viscosity of more than 300 mPa.s is recommended. The viscosity can be varied within a wide range by the choice of solvent in which the block polymerization is carried out and especially by the quantity of solvent. A greater dilution leads to lower degrees of polymerization and correspondingly smaller increases in viscosity, while more concentrated solutions facilitate the formation of higher molecular weight block polymer and lead to products with higher viscosity. The amount of solvent that may be added per part by weight of starting material used (sum of reaction component (a) and (b)) is from about 0.3 to 1.5 parts by volume (at 20° C.). When a starting material is used in which less than 10 parts by weight of component (b) are contained per 100 parts by weight of component (a), the addition of less than 1.2 and especially less than 1 part by volume per 1 part by weight of starting material is preferred. When the proportion of component (b) in the starting material is greater, the amount of solvent may be increased.

In any event, at least that much solvent should be present so that the reaction components (a) and (b) are present in a homogeneous phase. When products are obtained with a very high viscosity that makes further processing difficult, for example, a viscosity exceeding 10,000 mPa.S, the amount of solvent can be increased above the minimum amount that is required to reach a homogeneous phase. This facilitates adjusting the characteristics of the foam inhibitors to the respective conditions.

The reaction temperature should be at least 80° C. If the work is carried out at atmospheric pressure and at the boiling temperature of the solvent used, the reaction temperature is dependent on the solvent's boiling temperature. Temperatures exceeding 200° C. are not required. Thus, the reaction is preferably carried out at temperatures of from about 80° C. to 200° C., particularly from about 100° to 160° C.

The viscosity changes are not uniform at the beginning of the reaction, during an induction period that may last from about five minutes to approximately one hour, depending upon the temperature. During this interval, the viscosity of the reaction material first depends upon the viscosity of the individual components and can assume very widely varying values. As the polymerization continues, the influence of the block polymer becomes increasingly noticeable, and the viscosity increases steadily, approaching a boundary value due to the fact that all groups with binding capacity are saturated. It is by no means necessary, however, for an optimal foam inhibition, that all active groups are saturated, particularly since the rate of reaction decreases steadily, after an initially faster rate, with the progressing degree of conversion, and the subsequent increase in viscosity continues only very slowly. Usuable products may be obtained after only a minimum of two hours of heating at temperatures above 100° C., but their properties usually can be improved considerably by extending the heating period to from 4 to 20 hours. An extension of the reaction time beyond from 25 to 30 hours does not result in any significant further improvement of the effectiveness, however, and is thus generally unnecessary. The heating period in the temperature range of from 100° to 160° C. preferably amounts to from 6 to 20 hours.

After the complete polymerization, the alkaline block polymerization initiators are advantageously inactivated by neutralization, especially with organic acids such as formic acid or acetic acid. If solvents were used, these are distilled off before further processing.

A suitable silicic acid is one with a particle size of approximately 6 to 30 mμ and a specific surface of at least 80 m²/gm, as it can be obtained, for example, by the pyrogenic hydrolysis of silicon tetrachloride. It is preferred to use silanated silicic acid that is made hydrophobic, for example, by pretreatment with trimethylchlorosilane, dimethyldichlorosilane, or cyclic polydimethylsiloxanes. In contrast to a non-silanated silicic acid, silanated silicic acid offers the advantage of a quick and better homogenization. By definition, from about 1 to 15, preferably from about 2 to 10, parts by weight of the preferably silanated silicic acid are used for a block polymer prepared from 100 parts by weight polydimethyldisiloxane and from about 2 to 20 parts by weight of polysiloxane resin. The homogenization takes place in the known manner, with intensive mechanical working of the material to be mixed at temperatures of from about 20° to 100° C. The mixing is advantageously continued during subsequent heating to temperatures of from about 100° to 250° C., preferably from about 120° to 100° C. A heating period of from about 2 to 5 hours generally is adequate for the formation of stable adducts.

The block polymers prepared according to the invention and their mixtures or adducts with silicic acid are new products. The silicic acid-free block polymers have viscosities of from about 200 to 20,000, preferably of from about 300 to 10,000, mPa.s, as measured at 20° C., depending on the choice and amount of starting materials as well as the reaction conditions. They are homogeneous, clear liquids.

Stable mixtures of the block polymers according to the invention with silicic acid aerogels are exceptionally suitable as foam inhibitors for any area of application, such as the paper industry, crude oil drilling, sugar refining, textile industry, waste water treatment, in latex and synthetic resin dispersions, or cutting oil emulsions, as well as in distillation and flotation processes. The stable mixtures are resistant to alkalies and are not inactivated by aqueous tenside or alkali solutions. Consequently, they can be used to special advantage in washing agents, where their incorporation in the washing agent slurry and subsequent spray-drying does not lead to loss of effectiveness, which is surprising. When used in washing and cleaning agents, the stable mixtures are from 10 to 100 times more effective than the foam inhibitors based on silicon than have previously been recommended for this purpose.

An additional aspect of the invention is the use of the products of the process in washing, dishwashing, cleaning, and textile post-treatment agents. Of particular interest in these regards are those agents with a cleaning effect that are used in closed dishwashers and washing machines with strong mechanical action on the objects to be cleaned, for example, automatic washers and dishwashers.

The content of the products according to the process of the invention in such washing, dishwashing, cleaning, and post-treatment agents may be from about 0.001 to 1, preferably from about 0.005 to 0.5, percent by weight, based on the total weight of the agent, depending on the foam intensity of the present active substances and the degree of the intended effect. Generally, very small amounts of foam inhibitor are needed because of the exceptional inhibitor effect of the products according to the invention, in comparison with known inhibitors based on polysiloxane.

Washing and cleaning agents of the type mentioned usually contain anionic, non-ionic, switterionic, and, if desired, also cationic tensides, builder salts, and alkalies as well as other additives that improve the washing and cleaning results or enhance the properties of application of the materials to be cleaned.

Anionic tensides suitable for washing and cleaning agents are those of the sulfonate or sulfate type, especially alkylbenzenesulfonates, olefin sulfonates, alkylsulfonates, α-sulfo esters of fatty acids, and primary alkyl surfaces as well as the sulfates of ethoxylated higher molecular alcohols containing 2 to 3 glycol ether groups. Also suitable are alkali metal soaps of fatty acids of natural or synthetic origin, for example, the sodium salts of fatty acids of coconut, palm kernel, or tallow. The anionic tensides are preferably in the form of the sodium salts. If the mentioned anionic and zwitterionic compounds have an aliphatic hydrocarbon radical, this radical preferably has a linear chain of from about 8 to 22, preferably from about 12 to 18, carbon atoms. In the compounds with an araliphatic hydrocarbon radical, the preferably unbranched, alkyl chains contain from about 6 to 16, preferably from about 10 to 14, carbon atoms.

Suitable nonionic tensides are particularly ethoxylation products of saturated or mono-unsaturated aliphatic primary alcohols with from about 12 to 24, preferably from about 12 to 18, carbon atoms and from about 3 to 20, particularly from about 4 to 15, ethylene glycol ether groups. Suitable alcohols, from which the present ethoxylation products are derived, are, for example, those of natural origin such as coconut fatty alcohol or tallow fatty alcohol, or oleyl alcohol, or oxoalcohols or synthetic alcohols obtained by ethylene polymerization.

Other suitable nonionic tensides include ethoxylation products of secondary alcohols, vicinal diols, and amino alcohols with, respectively, from about 12 to 18 carbon atoms, as well as alkylphenols with from 6 to 12 carbon atoms in the alkyl radical, with the number of glycol ether groups also amounting to from about 3 to 20, preferably from about 4 to 15. The above-mentioned ethoxylated alcohols, amino alcohols, and alkylphenols also may be replaced partly or completely by those that are prepared with initially from about 0.5 to 3 mols of propylene oxide per mol of starting compound, the final, intended amount of the ethylene oxide being added in a second step.

If desired, such nonionic tensides that are derived from the above-mentioned compounds and contain ethylene glycol as well as propylene glycol ether groups in a different sequence, for example, alcohols with from about 10 to 30 ethylene glycol ether groups and from about 3 to 30 propylene glycol ether groups, also may be present. Furthermore, ethoxylation products of mercaptans, fatty acid amides, and fatty acids may be present. Also usable are the water-soluble polyethylene oxide adducts onto polyoxypropylene glycol, ethylenediaminopolyoxypropylene glycol, and alkylpolyoxypropylene glycol with from about 1 to 10 carbon atoms in the alkyl chain, containing from about 20 to 250 ethylene glycol ether groups and from about 10 to 100 propylene glycol ether groups. These compounds usually contain from about 1 to 5 ethylene glycol units per propylene glycol unit. Nonionic compounds of the type of the aminoxides and sulfoxides, which also may be ethoxylated if desired, are suitable as well.

Suitable builder substances are alkali metal polyphosphates, especially pentasodium triphosphate, as well as disphosphates and higher condensed phosphates such as, for example, tetraphosphates. Also suitable are cation exchanging, hydrous aluminosilicates of potassium, or particularly of sodium, of the general formula

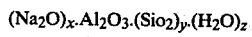

with
x = 0.9 to 1.5,
y = 1.3 to 4.0, and
z = 1 to 6.

These aluminosilicates generally have a grain size of 0.1 to 20μ and are preferably crystalline.

Additional useful builder salts include salts of aminopolycarboxylic acids that have a complexing effect, particularly alkali metal salts of nitrilotriacetic acid and ethylenediaminotetraacetic acid, as well as the higher homologs of these aminopolycarboxylic acids. Salts of nitrogen-free polycarboxylic acids that form complex salts with calcium ions, which also include polymers containing carboxyl groups, are suitable as well. Examples include citric acid, tartaric acid, benzene hexacarboxylic acid, and tetrahydrofurantetracarboxylic acid. Also suitable are polycarboxylic acids containing carboxymethyl ether groups such as 2,2'-oxydisuccinic acid as well as polyhydric alcohols, partially or completely etherified with glycolic acid or hydroxycarboxylic acids, such as, for example, tris-(carboxymethyl)glycerol, bis-(carboxymethyl) glyceric acid, carboxymethyloxysuccinic acid, and carboxymethylated or oxidized polysaccharides. Similarly suitable are the polymeric carboxylic acids with a molecular weight of at least 350 in the form of the water-soluble sodium or potassium salts, such as polyacrylic acid, polymethacrylic acid, poly-α-hydroxyacrylic acid, polymaleic acid, polyitaconic acid, polymesaconic acid, and polybutenetricarboxylic acid as well as the copolymers of the respective monomeric carboxylic acids with each other or with ethylenically unsaturated compounds such as ethylene, propylene, isobutylene, vinyl-methyl ether, or furan.

Complexing salts of polyphosphonic acid, for example, the alkali metal salts of aminopolyphosphonic acids, particularly aminotri(methylenephosphonic acid), 1-hydroxyethane-1,1-diphosphonic acid, phenylhydroxymethanediphosphonic acid, and methylenediphosphonic acid, as well as salts of the higher homologs of these polyphosphonic acids, may also be present. Mixtures of the above-mentioned complexing agents are suitable too.

Other components that can be contained in the washing agents include washing alkalies, neutral salts, greying inhibitors, optical brighteners, stabilizers such as magnesium silicate, substances with a lustrous effect, and dyes, as well as additives that improve the spraydrying properties, such as, for example, alkali metal salts of toluene, xylene, or cumenesulfonic acid.

Suitable washing alkalies include alkali metal carbonates, bicarbonates, borates, and silicates with an $Na_2O$:$SiO_2$ ratio of from about 1:1 to 1:3.5. Sodium sulfate and sodium chloride are suitable as neutral salts.

Particularly suitable greying inhibitors include mixed ethers of cellulose containing varying amounts of carboxymethyl, methyl, and/or hydroxyethyl, hydroxypropyl, and hydroxybutyl groups, especially methylhydroxypropyl cellulose and methylhydroxybutyl cellulose, as well as polymers or copolymers of vinyl alcohol, vinylpyrrolidone, acrylamide, and acrylonitrile that are colloidally soluble in water.

Suitable optical brighteners include the alkali metal salts of 4,4-bis(2''-anilino-4''-morpholino-1,3,5-triazinyl-6''-amino)-stilbene-2,2'-disulfonic acid or similarly structured compounds that carry a diethanolamino group, a methylamino group, or a β-methoxyethylamino group instead of the morpholino group. Also suitable as brighteners for polyamide fibers are those of the type of the diarylpyrazolines, for example, 1-(p-sulfonamidophenyl)-3-(p-chlorophenyl)-$\Delta^2$-pyrazoline as well as similarly structured compounds that carry a carboxymethyl or acetylamino group instead of the sulfonamido group. Also suitable are substituted aminocoumarins, for example, the 4-methyl-7-dimethylamino or the 4-methyl-7-diethylaminocoumarin.

The compounds 1-(2-benzimidazolyl)-2-(1-hydroxyethyl-2-benzimidazolyl)-ethylene and 1-ethyl-3-phenyl-7-diethylaminocarbostyryl are also suitable as polyamide brighteners. Suitable as brighteners for polyester and polyamide fibers are the compounds 2,5-di-(2-benzoxyzolyl)-thiophene, 2-(2-benzoxyzolyl)-naphtho-(2,3-b)-thiophene, and 1,2-di-(5-methyl-2-benzoxyzolyl)-ethylene. Furthermore, brighteners of the type of the substituted diphenylstyryls may be present. Mixtures of the brighteners mentioned before also can be used.

An additional power component that may be added, if desired, preferably contains a per-comound, for example, sodium percarbonate, but especially sodium perborate tetrahydrate.

Furthermore, additional powder components that can contain enzymes or bleach activators may be added. The enzymes and bleach activators may be coated with film substances that are soluble in or dispersable in water, as protection against decomposition or interactions with the other powder components of the washing agent.

The washing agents are advantageously prepared by spray-drying in a known manner from an aqueous slurry, for which the products of the process of the invention can be dispersed directly in the slurry and spray-dried together with it. Such spray-dried powders usually weigh from about 300 to 600 gm per liter. If desired, the washing and cleaning agents also may be prepared by known granulation methods. In this case as well, the products of the process according to the invention can be incorporated into the granulates either directly or mixed with tensides and other components, which simplifies the preparation considerably.

The washing agents in powder form, prepared in the given manner, are characterized by a favorable foam property. The small amounts of block polymers, which are necessary for extensive foam inhibition, do not exert a negative influence on the wetting properties of the powder mixtures in contrast to the less effective known polysiloxane demulgators, and no difficulties must be expected with respect to rinsing during use in automatic washers and diswashers. Another advantage is the fact that the foam-reducing effect of the siloxanes does not suffer any losses during the storing of the powder mixtures. No greying of the textiles and no coating of the washer parts with a very difficult to remove siloxane film occurs, even after repeated use of the agents.

For the compounding for any area of application, the polysiloxane block polymers according to the invention can be dissolved in solvents or changed into emulsions with the addition of conventional emulsifying agents.

The following examples are intended to illustrate the invention and are not to be construed as limiting the invention thereto.

EXAMPLES

Preparation

Examples 1 to 28 are directed to the preparation of the foam inhibitors according to the invention. The viscosities of the products were determined at 20° C.

Example 1

A reaction compound (a) consisted of a commercial polydimethylsiloxane that contained approximately 65 percent by weight of cyclic compounds and approximately 35 percent by weight of linear polydimethylsiloxanes with approximately 15 to 100 $(CH_3)_2SiO$ groups. A reaction component (b) consisted of a phenylmethylsiloxane resin with a mean molar mass of 1600, measured osmometrically, a molar ratio of phenyl to methyl groups of 1:0.8, and a content of hydroxyl groups of 3.3 percent by weight.

Six thousand six hundred grams of polydimethylsiloxane (a) and 660 gm of methylphenylsiloxane resin (b) were dissolved in 5,500 ml of toluene, mixed with 7 gm of tetramethylammonium hydroxide (as catalyst), and heated to 111° C. for 16 hours with constant agitation in a nitrogen atmosphere. Subsequently, the catalyst was neutralized by the addition of 60 ml of pure acetic acid, and the solvent as well as the excess acetic acid were distilled off. After the removal of volatile constituents by distillation at 180° C. under vacuum, the liquid block polymer obtained was filtered to remove the tetramethylammonium acetate. The block polymer was clear and homogeneous and had a viscosity of 952 mPa.s For the preparation of a foam inhibitor, the block polymer was homogeneously mixed with 3 percent by weight of a silanated silicic acid, obtainable by reaction of a silicic acid aerogel with dimethylchlorosilane, and heated for 3 hours at 200° C., with agitation. The obtained product had a viscosity of 2390 mPa.s, as measured at 20° C.

Comparison Example 1

The reaction components (a) and (b) were reacted in accordance with the procedure of Example 1 but in the absence of a catalyst. The polysiloxane resin (a) precipitated practically unchanged after the removal of toluene by distillation. Thus, no block polymerization had taken place.

Example 2

Two hundred twenty grams of the polydimethylsiloxane used in Example 1, 22 gm of the methylphenylsiloxane resin used therein, and 235 mg of tetramethylammonium hydroxide were heated in 180 ml toluene to 111° C. with agitation. The working up was the same as in Example 1. The respective reaction times and viscosities at 20° C. of the block polymer, prior to reaction with silanated silicic acid, are recorded in the following table:

TABLE 1

| Example | Heating Time (hrs.) | Viscosity (mPa.s) |
|---------|---------------------|-------------------|
| 2a | 2 | 444 |
| 2b | 4 | 497 |
| 2c | 7.5 | 852 |
| 2d | 16.0 | 952 |

After the incorporation of 3 percent by weight of silanated silicic acid, a defoaming effect was obtained that increased with the rising viscosity of compositions containing silanated silicic acid. See, for example, the examples below.

Examples 3 to 13

The following examples demonstrate the influence of the amount of solvent and the percentage of resin on the viscosity of the products of the process.

One hundred grams of octamethylcyclotetrasiloxane, component (a), were reacted with varying amounts of the methylphenylsiloxane resin (b) described in Example 1 and toluene, in the presence of 100 mg of tetramethylammonium hydroxide, as described in Example 1. After seperation of the solvent and the neutralized catalysts, the viscosity of the product was determined. An additional viscosity determination was carried out after the addition of the silanated silicic acid. The amounts of resin and toluene that were used, as well as the results, are recorded in the table below:

TABLE 2

| Example | Resin (gm) | Toluene (ml) | Viscosity (mPa.s) Without SiO2 | With SiO2 |
|---------|------------|--------------|-------------------------------|-----------|
| 3 | 5 | 83 | 977 | 2080 |
| 4 | 7.5 | 104 | 333 | 895 |
| 5 | 7.5 | 83 | 817 | 1620 |
| 6 | 10 | 104 | 291 | 644 |
| 7 | 10 | 83 | 922 | 2330 |
| 8 | 12.5 | 125 | 213 | 474 |
| 9 | 12.5 | 104 | 348 | 683 |
| 10 | 12.5 | 83 | 1010 | 2280 |
| 11 | 15 | 125 | 201 | 607 |
| 12 | 15 | 104 | 359 | 765 |
| 13 | 15 | 83 | 779 | 1640 |

Examples 14 to 21

Octamethylcyclotetrasiloxane was used as component (a), and a siloxane resin prepared by reaction of styrene with trichlorosilane and subsequent hydrolysis in a mixture of toluene and water was used as component (b). The radicals contained in the structural elements consequently had the following structures:

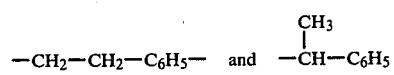

The content of hydroxyl groups was 5 percent by weight. The resin had a mean molecular weight of 4400.

A sample of 100 parts by weight of octamethylcyclotetrasiloxane was mixed with varying amounts of toluene and siloxane resin and 0.13 parts by weight of tetramethylammonium hydroxide, and the mixture was heated at 111° C. for 18 hours with agitation, in a nitrogen atmosphere. The mixture was worked up as in Example 1. The results are compiled in the table below:

TABLE 3

| Example | Resin (Parts by weight) | Toluene (Parts by volume) | Viscosity (mPa.s) Without SiO$_2$ | Viscosity (mPa.s) With SiO$_2$ |
|---|---|---|---|---|
| 14 | 10 | 73 | 762 | 1610 |
| 15 | 10 | 59 | 1410 | 7450 |
| 16 | 12.5 | 88 | 341 | 746 |
| 17 | 12.5 | 73 | 600 | 1170 |
| 18 | 12.5 | 59 | 1460 | 3980 |
| 19 | 15 | 88 | 276 | 611 |
| 20 | 15 | 73 | 524 | 1110 |
| 21 | 15 | 59 | 1360 | 5090 |

When the experiments were repeated in the absence of siloxane resin but under otherwise identical conditions, gel formation occurred shortly after a temperature of 111° C. was reached. The products obtained no longer could be agitated and did not flow.

Example 22

To prepare a siloxane resin, 178 gm of isobutyltrimethoxysiloxane, 200 ml of toluene, 1000 ml of water, and 1.36 gm of KOH were first agitated for 3 hours at room temperature and then refluxed for 2 hours at 100° C. After cooling, the toluene phase was separated and washed with water to remove the alkali. After distillation, a polyisobutylsiloxane resin with a mean molecular weight of 1600 remained, which resin contained 3 percent by weight of hydroxyl groups.

Four hundred grams of octamethylcyclotetrasiloxane, 8 gm of hexamethyldisiloxane (as terminating substance), and 105 gm of the polyisobutylsiloxane resin were heated, after the addition of 15 gm of acid-activated, dried bleaching earth, to 130° C. in a nitrogen atmosphere. The block polymer obtained was filtered while still warm and briefly heated to 150° C. under vacuum to remove the volatile constituents. The block polymer had a viscosity of 1570 mPa.s, as measured at 20° C., and after homogenization with 3 percent by weight of silanated silicic acid (prepared as in Example 1), the viscosity was 4080 mPa.s.

Example 23 to 28

The following examples were prepared with different solvents:

For this purpose, 100 gm of octamethylcyclotetrasiloxane, 10 gm of the methylphenylsiloxane resin (b) used in Example 1, and 100 mg of tetramethylammonium hydroxide were heated in 104 ml of a solvent (as set forth in the table below) to 110° to 112° C. in a nitrogen atmosphere for 16 hours. When benzene factions were used as solvent (the numbers given indicate the boiling range in °C.), the solutions initially were somewhat cloudy due to undissolved catalyst. This cloudiness cleared up within a few hours. After the working up according to the procedure of Example 1, block polymers with the viscosities set forth in the following table were obtained.

TABLE 4

| Example | Solvent | Viscosity (Without SiO$_2$, mPa.s) |
|---|---|---|
| 23 | toluene | 305 |
| 24 | benzene 100/140 | 512 |
| 25 | benzene 140/200 | 269 |
| 26 | xylene | 1150 |
| 27 | cumene | 757 |
| 28 | butylacetate | 414 |

The block polymers were worked up and homogenized with silanated silicic acid, as described in Example 1.

USE OF FOAM INHIBITORS ACCORDING TO THE INVENTION

For the testing of the foam behavior, the inhibitors prepared according to the invention were incorporated into washing agents in various ways. The foam properties of these washing agents were tested under working conditions resembling actual operation in a commercially available washer with Model Miele Deluxe 433, available from Miele & Cie, Federal Republic of Germany of from about between 30° to 95° C. For this purpose, the machine was loaded with 3.5 kg of clean filler wash (cotton). The washing agent concentration was 7.5 gm and the water hardness 16° dH (German hardness). The respective height of the foam was checked through the glass in the front door and graded as follows:

```
0 = no foam
1 = ¼ of the glass
2 = ½ of the glass
3 = ¾ of glass
4 = 4/4 of glass
5 = foam in the filling tube
6 = foam overflowing
```

The composition of the washing agent was as follows:

| Component | Amount (Percent by weight) |
|---|---|
| n-Dodecylbenzenesulfonate (Sodium salt) | 8.0 |
| Sodium Soap (tallow:coconut = 4:1) | 2.2 |
| Tallow fatty alcohol + 5 EO | 2.5 |
| Tallow fatty alcohol + 14 EO | 1.9 |
| Sodium tripolyphosphate | 20.0 |
| Sodium aluminosilicate (cation exchanger) | 20.0 |
| Sodium Silicate (Na$_2$O:SiO$_2$ = 1:3) | 3.0 |
| Magnesium silicate | 2.1 |
| Ethylenediaminetetraacetic acid | 0.3 |
| Sodium carboxymethyl cellulose | 0.9 |
| Optical brightener | 0.3 |
| Sodium sulfate | 10.3 |
| Sodium perborate tetrahydrate | 20.0 |
| Water | balance |

With the exception of the perborate, which is added subsequently to the powder, all constituents were mixed into a slurry and spray-dried.

In a first test series, the products of the process as well as the comparison products were adsorbed on a granular, porous, water-soluble carrier substance, which was obtained by spray-drying an aqueous solution of tripolyphosphate solution (water content of 35 percent by weight) and had an apparent density of 520 gm and a grain size of from 0.1 to 1.6 mm. The adsorbate with a content of 7.5 gm of foam inhibitor and 92.5 gm of carrier substance was evenly mixed with the washing powder in varying amounts. In a second test series, the foam inhibitors were mixed with the slurry and spray-dried with these.

To demonstrate the efficacy of the invention, comparison products were tested for effectiveness. Two of the comparison products were commercially available foam inhibitors, SAG 100, available from Union Carbide Corp. (designated as V$_1$) and Q2-3008, available from Dow Corning Corp. (designated as V₂), which are considered particularly suitable for washing agents. These are believed to be polydimethylsiloxanes containing silicon dioxide.

Other comparison products were prepared as follows:

Comparison Product $V_3$

An amount of 7850 gm of a dimethylpolysiloxane with a viscosity of 420 mPa.s, as measured at 20° C., was heated to 100° C. in a nitrogen atmosphere with agitation, reacted with 1570 gm of a polysiloxane resin containing $(CH_3)_3$—$SiO_{\frac{1}{2}}$— and $SiO_2$ units at a ratio of 0.67:1, and then agitated for another 3½ hours at 100° C., for the purpose of homogenization. After the addition of 377 gm of a silicic acid aerogel (AEROSIL® R 972, available from Degussa, Inc.), the mixture was heated to 180° C. with continued agitation and maintained there for 5 hours. The viscosity of the product of the process was 3130 mPa.s.

The preparation and composition correspond to data in U.S. Pat. No. 3,455,839, incorporated herein by reference.

Comparison Product $V_4$

A mixture was used that was obtained by heating polydimethylsiloxane and methylphenylsiloxane resin in toluene in the absence of a catalyst according to the Comparison Example 1, and subsequent homogenization at 200° C. with 3 percent by weight of silanated silicic acid.

Testing of products according to the invention and the comparison products are set forth in Tables 5 and 6 below, respectively:

TABLE 5

| Inhibitor Example | Amount (Percent by weight) | Foaming Grades After Admixture 30° C. | 60° C. | 95° C. | After Spraying-drying 30° C. | 60° C. | 95° C. |
|---|---|---|---|---|---|---|---|
| 1 | 0.2 | 0 | 0.5 | 0.5 | 0 | 0.5 | 1 |
| 1 | 0.1 | 0.5 | 1 | 1 | 0.5 | 1 | 1 |
| 1 | 0.05 | 2 | 2 | 1 | 1 | 1 | 1 |
| 1 | 0.01 | 2 | 3 | 3 | 2 | 2 | 2 |
| 2a | 0.1 | 3 | 4 | 4 | — | — | — |
| 2b | 0.1 | 3 | 4 | 3 | — | — | — |
| 2c | 0.1 | 1 | 2 | 2 | — | — | — |
| 2d | 0.1 | 1 | 1.5 | 1 | 1 | 2 | 1 |
| 3 | 0.1 | 1 | 2 | 1 | 1 | 1 | 1 |
| 4 | 0.1 | 2 | 3 | 2 | 2 | 3 | 2 |
| 5 | 0.1 | 0.5 | 1 | 1 | 1 | 1 | 1 |
| 6 | 0.1 | 1 | 2 | 2 | 2 | 3 | 2 |
| 7 | 0.1 | 0.5 | 2 | 1 | 1 | 2 | 1 |
| 8 | 0.1 | 1 | 2 | 2 | 1 | 2 | 2 |
| 9 | 0.1 | 1 | 2 | 1 | 2 | 3 | 2 |
| 10 | 0.1 | 0 | 1 | 0.5 | 1 | 1 | 1 |
| 11 | 0.1 | 2 | 2 | 2 | 1 | 2 | 2 |
| 12 | 0.1 | 1 | 2 | 1 | 1 | 2 | 2 |
| 13 | 0.1 | 0 | 1 | 1 | 1 | 1 | 1 |
| 14 | 0.1 | 1 | 3 | 2 | 2 | 3 | 2 |
| 15 | 0.1 | 1 | 2 | 1 | 1 | 2 | 2 |
| 16 | 0.1 | 2 | 2 | 2 | 1 | 2 | 2 |
| 17 | 0.1 | 1 | 2 | 1 | 1 | 2 | 1 |
| 18 | 0.1 | 0.5 | 1 | 0.5 | 1 | 1 | 1 |
| 19 | 0.1 | 2 | 2 | 1 | 2 | 2 | 2 |
| 20 | 0.1 | 1 | 2 | 2 | 1 | 2 | 2 |
| 21 | 0.1 | 0.5 | 0.5 | 1 | 0.5 | 1 | 1 |
| 22 | 0.1 | 0.5 | 1 | 1 | 0.5 | 1 | 1 |
| 23 | 0.1 | 1 | 2 | 2 | 1 | 2 | 2 |
| 24 | 0.1 | 1 | 2 | 2 | 1 | 2 | 2 |
| 25 | 0.1 | 1 | 3 | 2 | 1 | 3 | 3 |
| 26 | 0.1 | 0.5 | 1 | 1 | 0.5 | 1 | 1 |
| 27 | 0.1 | 0.5 | 1 | 1 | 1 | 2 | 2 |
| 28 | 0.1 | 2 | 3 | 2 | 1 | 3 | 2 |

TABLE 6

| Comparison Inhibitor | Amount (Percent by weight) | Foaming Grades After Admixture 30° C. | 60° C. | 95° C. | After Spraying-drying 30° C. | 60° C. | 95° C. |
|---|---|---|---|---|---|---|---|
| (Without Inhibitor) | — | 6 | 6 | 6 | 6 | 6 | 6 |
| $V_1$ | 0.2 | 1 | 2 | 2 | 3 | 4 | 4 |
|  | 0.1 | 2 | 4 | 3 | 4 | 6 | 5 |
|  | 0.05 | 3 | 5 | 5 | 6 | 6 | 6 |
| $V_2$ | 0.2 | 1 | 1 | 1 | 3 | 4 | 4 |
|  | 0.1 | 1 | 2 | 2 | 4 | 5 | 5 |
|  | 0.05 | 2 | 5 | 4 | 4 | 6 | 6 |
| $V_3$ | 0.2 | 0.5 | 1 | 1 | 2 | 4 | 3 |
|  | 0.1 | 2 | 3 | 3 | 3 | 6 | 6 |
|  | 0.05 | 3 | 5 | 4 | 6 | 6 | 6 |
| $V_4$ | 0.2 | 1 | 2 | 2 | 3 | 4 | 4 |
|  | 0.1 | 2 | 3 | 3 | 4 | 6 | 6 |
|  | 0.05 | 3 | 5 | 6 | 6 | 6 | 6 |

The results show that the foam inhibitors prepared according to the invention are considerably more effective than the known agents, particularly at very low concentrations. In addition, the full effectiveness of foam inhibitors according to the invention remains unchanged even after spray-drying, while the known foam inhibitors on a silicon base suffer a considerable loss under these conditions. When very small amounts are used, the effect of the block polymers according to the invention is even better after spray-drying than after regular addition by mixing, which probably may be attributable to the more homogeneous distribution of the foam inhibitors present in the spray-dried powder in a very small quantity. A comparably homogeneous and reproducible distribution cannot be achieved by mixing the pre-finished powders, despite the greater expense of the process.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A method for preparing a foam-inhibiting composition comprising the steps of:
   (1) mixing (a) 100 parts by weight of polydimethylsiloxane that is liquid at 20° C., and (b) from about 2 to 20 parts by weight of a spatially cross-linked polysiloxane resin with a molecular weight of from about 1000 to 10,000, which is comprised of structural elements of the general formula

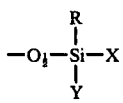

wherein R consists of from about 40 to 100 mol percent of a phenyl, phenylethyl, or alkyl radical having from 2 to 8 carbon atoms and of from 0 to about 40 mol percent of a methyl group, and X and Y, which can be the same or different, have the same meaning as R or can be OH, O$_\frac{1}{2}$, methyl, or —OC$_n$H$_{2n-1}$, wherein n is a number of from 1 to 4, with the proviso that the content of OH groups is from about 0.1 to 10 percent by weight, based on the total weight of the polysiloxane resin, to form a mixture thereof;

(2) heating said mixture to temperatures of at least 80° C. in the presence of a catalytically effective amount of a catalyst comprising an acid substance selected from the group consisting of Lewis acids and acid-activated bleaching earths or a basic substance selected from the group consisting of quaternary ammonium bases with alkyl groups and/or hydroxyalkyl groups having from 1 to 4 carbon atoms and alkali metal hydroxides, and optionally, an organic solvent that does not react with the reaction components, until the viscosity increases steadily after an induction period and has reached a value of at least 200 mPa.s, as measured at 20° C., to form a block polymer;

(3) mixing said block polymer in a known manner with (c) from about 1 to 15 parts by weight of a silicic acid aerogel to form a mixture thereof; and (4) heating said mixture from step (3).

2. The method of claim 1, wherein the silicic acid aerogel (c) is silanated.

3. The method of claim 1, wherein cyclic polydimethylsiloxanes that contain 3 or more siloxane groups and/or linear polydimethylsiloxanes with from about 10 to 100 siloxane groups are used as component (a).

4. The method of claim 1, wherein phenylmethylpolsiloxane resins with a content of from about 1 to 6 percent by weight of hydroxyl groups and with a molar ratio of phenyl to methyl groups of from about 2:3 to 10:1 are used as component (b).

5. The method of claim 1, wherein phenylethylpolysiloxane resins with a content of from about 0.5 to 10 percent by weight of hydroxyl groups are used as component (b).

6. The method of claim 1, wherein alkylpolysiloxane resins with branched alkyl groups containing from about 3 to 8 carbon atoms and with a content of hydroxyl groups of from about 0.5 to 8 percent by weight are used as component (b).

7. The method of claim 1, wherein phenylethylmethylpolysiloxanes or C$_3$–C$_8$-alkylmethylpolysiloxanes having branched C$_3$–C$_8$-alkyl radicals, either with a content of from about 1 to 6 percent by weight of hydroxyl groups and a molar ratio of phenylethyl or C$_3$–C$_8$-alkyl groups to methyl groups of from about 100:1 to 2:3 are used as component (b).

8. The method of claim 1, wherein the polysiloxane resins (b) have a molecular weight of from about 1200 to 5000.

9. The method of claim 1, wherein from about 3 to 20 parts by weight of component (b) are used per 100 parts by weight of component (a).

10. The method of claim 1, wherein from about 1 to 5 parts by weight, based on 100 parts by weight of component (a), of acid-activated bleaching earth are used as catalyst, and the procedure is carried out in the absence of solvents.

11. The method of claim 1, wherein the catalyst is a basic substance selected from the group consisting of quaternary ammonium bases with alkyl groups having from 1 to 4 carbon atoms and alkali metal hydroxides, and the procedure is carried out in the presence of a solvent selected from the group consisting of saturated, aliphatic, and aromatic hydrocarbons and carboxylic acid esters, said solvent having a boiling point above 100° C.

12. The method of claim 1, wherein component (b) comprises less than 10 parts by weight, per 100 parts of component (a), and less than 1.2 parts by volume of a solvent are used, based upon 1 part by weight of components (a) and (b).

13. The method of claim 12, wherein less than 1 part by volume of solvent is used.

14. The method of claim 1, wherein less than 10 parts by weight of component (b) are used and the mixture of components (a) and (b) is heated until the viscosity of the block polymer is at least 400 mPa.s.

15. The method of claim 14, wherein the viscosity of the block polymer is at least 500 mPa.s.

16. The method of claim 1, wherein 10 or more parts by weight of component (b) are used and the mixture of components (a) and (b) is heated until the viscosity of the block polymer is at least 300 mPa.s.

17. The method of claim 1, wherein the mixture of components (a) and (b) is heated at a temperature of from about 100° to 160° C.

18. The method of claim 1, wherein the mixture of components (a) and (b) is heated for from about 6 to 20 hours.

19. A foam-inhibiting composition prepared according to claim 1.

20. A method for inhibiting foam in washing, dishwashing, or cleaning agents which comprises incorporating therein a foam-inhibiting composition of claim 19.

21. A block polymer prepared according to claim 1, steps (1) and (2).

22. The method of claim 1, wherein from about 0.001 to 1 part by weight, based on 100 parts by weight of component (a), of Lewis acid is used as catalyst.

23. The method of claim 1, wherein from about 0.001 to 1 part by weight, based on 100 parts by weight of component (a), of basic substance is used as catalyst.

* * * * *

UNITED STATES PATENT AND TRADEMARK OFFICE
CERTIFICATE OF CORRECTION

PATENT NO. : 4,396,524
DATED : August 2, 1983
INVENTOR(S) : HANS U. HEMPEL et al.

It is certified that error appears in the above-identified patent and that said Letters Patent is hereby corrected as shown below:

Column 8, line 2, "switterionic" should read -- zwitterionic --.

Column 8, lines 12-13, "either" should read -- ether --.

Column 14, line 12, after "with" insert -- horizontally attached drum ( --.

lines 13-14, after "Germany" insert -- ), at temperatures --.

Signed and Sealed this

Twenty-ninth Day of January 1985

[SEAL]

Attest:

DONALD J. QUIGG

Attesting Officer

Acting Commissioner of Patents and Trademarks